(12) United States Patent
Xia et al.

(10) Patent No.: US 11,496,474 B1
(45) Date of Patent: Nov. 8, 2022

(54) MESH CONFIGURATION PORTING IN A CLOUD-BASED MESH DEPLOYMENT

(71) Applicant: HEWLETT PACKARD ENTERPRISE DEVELOPMENT LP, Houston, TX (US)

(72) Inventors: Longping Xia, Santa Clara, CA (US); Vivek Batra, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/473,965

(22) Filed: Sep. 13, 2021

(51) Int. Cl.
| | |
|---|---|
| *H04L 9/32* | (2006.01) |
| *H04L 9/08* | (2006.01) |
| *H04W 12/00* | (2021.01) |
| *H04L 9/40* | (2022.01) |
| *G06F 16/245* | (2019.01) |
| *H04L 41/0803* | (2022.01) |
| *H04L 67/10* | (2022.01) |

(52) U.S. Cl.
CPC ........ *H04L 63/0876* (2013.01); *G06F 16/245* (2019.01); *H04L 41/0803* (2013.01); *H04L 67/10* (2013.01)

(58) Field of Classification Search
CPC . H04L 63/0876; H04L 41/0803; H04L 67/10; G06F 16/245
USPC .......................................................... 726/6
See application file for complete search history.

(56) References Cited

U.S. PATENT DOCUMENTS

| 9,455,959 | B1* | 9/2016 | Garg | H04L 63/0281 |
| 2008/0226071 | A1* | 9/2008 | Braskich | H04W 12/50 380/258 |
| 2014/0092765 | A1* | 4/2014 | Agarwal | H04W 24/02 370/252 |
| 2017/0064621 | A1* | 3/2017 | Garg | H04W 48/18 |
| 2018/0213580 | A1* | 7/2018 | Taskin | H04W 76/11 |
| 2019/0141645 | A1* | 5/2019 | Abouelseoud | H04W 12/06 |
| 2020/0344599 | A1* | 10/2020 | Duo | H04W 60/00 |
| 2020/0359349 | A1* | 11/2020 | Duo | H04W 8/005 |

* cited by examiner

*Primary Examiner* — Ruolei Zong
(74) *Attorney, Agent, or Firm* — Sheppard Mullin Richter & Hampton LLP

(57) ABSTRACT

Systems, methods, and computer-readable media for performing a cloud-based authentication of a mesh point are described. A mesh point can send out a probe request that includes information indicating that the mesh point has entered a cloud-based porting mode. Upon receiving the probe request, the mesh portal sends an authentication request to a cloud system. The cloud system returns an authentication response indicating whether the mesh point has been authenticated. If successfully authenticated, the cloud system or a device forming part of the mesh deployment such as a virtual controller pushes the mesh configuration to the mesh point. In this manner, a mesh point can be configured with the correct mesh configuration without having to first push the mesh configuration to the mesh point at a common staging location and then physically move the mesh point to its serving location, as is the case in conventional mesh deployments.

20 Claims, 6 Drawing Sheets

MESH CONFIGURATION PORTING IN A CLOUD-BASED MESH DEPLOYMENT

BACKGROUND

Wireless mesh networks employ a local network topology in which infrastructure nodes (e.g., bridges, switches, routers, access points, etc.) connect directly, dynamically, and non-hierarchically to as many other nodes as possible and cooperate with one another to route data through the network. In a traditional mesh network deployment, mesh points such as access points are brought to a staging location and connected to the same wired network in order to form a swarm that allows for the mesh point configuration to be synced among the mesh points. Once the configurations are synced, the mesh points are disconnected from the wired network and moved from the staging location to their various serving locations.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
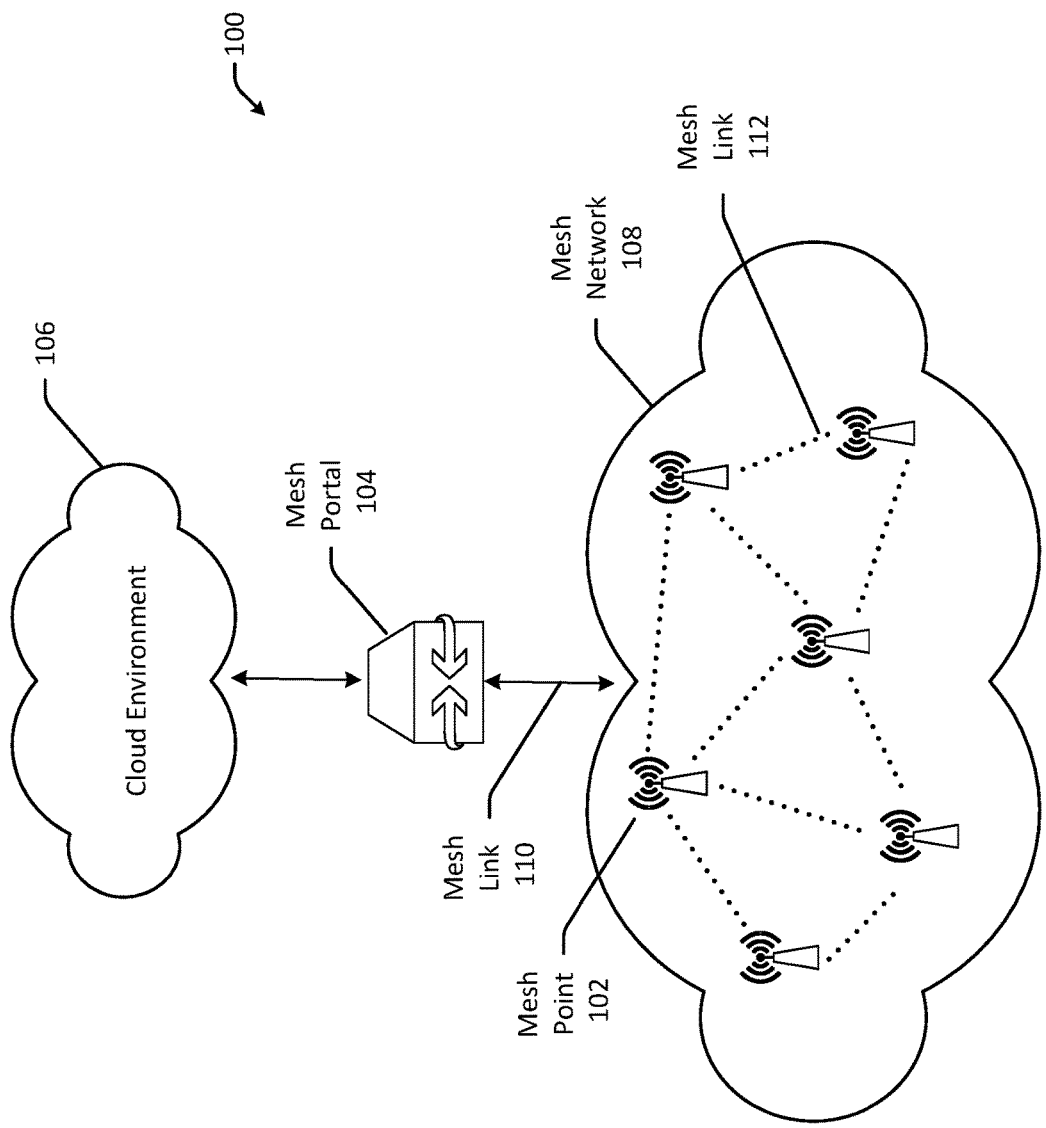
FIG. 1 is a schematic diagram of a cloud-based mesh deployment according to example embodiments of the disclosed technology.

The figures are not exhaustive and do not limit the present disclosure to the precise form disclosed.

DETAILED DESCRIPTION

Example embodiments of the disclosed technology relate to, among other things, systems, methods, computer-readable media, techniques, and methodologies for performing a cloud-based authentication of a mesh point in response to initial failure of the mesh point to establish a mesh link with a mesh portal. Upon successful cloud-based authentication of the mesh point and association of the mesh point with the mesh portal, a mesh configuration may be ported to the mesh point to enable the mesh point to properly communicate with other nodes in the mesh deployment.

Embodiments of the disclosed technology provide technical solutions to various technical problems associated with conventional mesh configuration porting techniques. In a traditional mesh network deployment, an onsite team connects the mesh points to a same wired network at a staging location, and then moves the mesh points to their respective serving locations after the mesh configuration—which may be specified by a network administrator—is pushed to the devices. This requires the efforts of multiple teams, which can introduce scheduling difficulties, as well as physical contact with the mesh points on multiple occasions. Embodiments of the disclosed technology address this technical problem by providing a cloud-based authentication and mesh configuration porting process that does not require the mesh points to be connected to a same wired network at a staging location as part of deployment of the mesh network. Rather, according to embodiments of the disclosed technology, a mesh point can be authenticated in the cloud, and upon authentication, can receive a mesh configuration, all while being physically located at its serving location. As such, embodiments of the disclosed technology obviate the need for a staging location to push the mesh configuration to the mesh point.

Further, in a traditional mesh deployment, if a mesh point receives an improper mesh configuration or the mesh configuration that it receives is improperly modified or lost, the mesh point is replaced in the field via, for example, a return merchandise authorization (RMA) process, which can be costly. Embodiments of the disclosed technology solve this technical problem and obviate the need to swap out a mesh point that is improperly configured. In particular, by providing cloud-based management of a mesh deployment that includes the capability to remotely reload a mesh point from the cloud, the mesh point can be re-authenticated and the correct mesh configuration can be pushed to the mesh point without requiring a physical replacement of the mesh point. Moreover, a mesh point can be seamlessly recovered in this manner without significantly impacting performance and/or connectivity of client devices connected to the mesh point. In contrast, in a traditional mesh deployment, if a mesh point does not have the correct mesh configuration and needs to be replaced, performance and connectivity of client devices connected to the mesh point are dramatically affected.

In example embodiments of the disclosed technology, if a mesh point such as an access point fails to establish a mesh link with a mesh portal after a predetermined period of time has elapsed, the access point enters a cloud-based porting mode. After entering the cloud-based mesh porting mode, the access point may send a probe request to a mesh portal. In some embodiments, the mesh portal may determine that the mesh point is in a cloud-based porting mode based on information contained in the probe request including, for example, the destination address (DA), the basic service set identifier (BSSID), and/or the service set identifier (SSIS) specified in the probe request. Upon determining that the probe request is a cloud-based probe request, the mesh portal may send an authentication request to a cloud system configured to authenticate the mesh point and manage the mesh deployment.

In some embodiments, the mesh portal may include information from the probe request in the authentication request. For instance, the mesh portal may include a media access control (MAC) address of the mesh point in the authentication request. Upon receipt of the authentication request, the cloud system may fetch one or more identifiers for the mesh portal and query a data store to determine if the one or more identifiers for the mesh portal are also linked to the mesh point. For instance, the cloud system may determine a site identifier and/or a customer identifier linked to the mesh portal and may further determine whether the same site identifier and/or customer identifier are also linked to the mesh point.

If the query returns a match, the cloud system may send an authentication response to the mesh portal indicating that the mesh point has been authenticated and should be accepted into the mesh deployment. In some embodiments, the mesh portal may then send a probe response to the cloud-based probe request that was initially received from the mesh point that indicates that the mesh point has been authenticated.

Upon receiving the probe response indicating acceptance, the mesh point may send an association request to the mesh portal, which may respond with an association response permitting the mesh point to establish a mesh link with the mesh portal. In some embodiments, once the mesh point establishes the mesh link, it joins the swarm and receives configuration information including a mesh configuration. In some embodiments, the cloud system may then send a reload command to the mesh point. The reload command may cause the mesh point to reload and then use the newly received mesh configuration to establish a mesh link with the mesh portal. In some embodiments, prior to the association request-response message exchange between the mesh point and the mesh portal, the mesh portal may first authenticate the mesh point. More specifically, and as explained in more detail later in this disclosure, the mesh point may send an authentication request to the mesh portal that includes a particular identifier (e.g., a device serial number) that the mesh portal may have previously received from the cloud system during the cloud-based authentication of the mesh point and stored in a datastore to which it has access. As such, the mesh portal may be configured to authenticate the mesh point according to a wireless access protocol using information it receives from the cloud system as a result of the prior cloud-based authentication.

In some embodiments, the mesh point receives the mesh configuration from the cloud system via the mesh portal. In particular, the mesh portal may have an uplink to the cloud system and downlinks to mesh points in the mesh network such that the cloud system can communicate the mesh configuration to the mesh point via the mesh portal. In other example embodiments, the mesh point may receive the mesh configuration from a virtual controller or the like, which may be another mesh point (e.g., a member access point of the mesh network) designated by the mesh portal for providing mesh configuration information.

In some embodiments, if a mesh point receives the wrong mesh configuration information, the mesh configuration does not sync properly, or the mesh configuration is later modified improperly or lost, the cloud system can send a reload command to the mesh point. In some embodiments, upon reloading, the mesh point attempts to establish a mesh link with a mesh portal, and if unsuccessful after some predetermined period of time has elapsed, enters the cloud-based porting mode. The cloud-based authentication process as described above may then be performed to authenticate the mesh point, and upon authentication, the correct mesh configuration may be delivered to the mesh point.

Referring now to FIG. 1, a cloud-based mesh network deployment 100 according to example embodiments of the disclosed technology is depicted. The cloud-based mesh deployment 100 includes a mesh network 108 that includes a collection of mesh points 102. The mesh network 108 may be a wireless local area network (WLAN) mesh network and the mesh points 102 may be wireless access points. In some embodiments, the mesh points 102 may include other types of network devices such as wireless routers.

The cloud-based mesh deployment 100 further includes a mesh portal 104 and a cloud environment 106. In some embodiments, the cloud environment 106 includes a cloud system, which may be, for example, a collection of cloud servers (e.g., a server cluster). As used herein, the terms "cloud and "cloud-based," or variants thereof, generally refer to a computing environment/system that includes a collection of computing devices (e.g., cloud servers) configured to provide services (e.g., computing services, storage services, etc.) to one or more devices physically located remotely from the cloud environment/system. Thus, the cloud environment 106 includes cloud devices located physically remotely from the mesh portal 104 and the mesh points 102. In example embodiments, deployment of the mesh points 102 occurs via the cloud environment 106 such that cloud devices in the cloud environment 106 can configure and deploy the mesh points 102 via the cloud-based authentication process disclosed herein while the mesh points 102 are located at their serving locations. That is, according to embodiments of the disclosed technology, the mesh points 102 can start off and remain at their ultimate serving locations, and can be configured and deployed from there without having to aggregate the mesh points at a staging location in order to first establish a wired connection, as conventional mesh deployment techniques require.

While depicted separately from the mesh network 108, in some embodiments, the mesh portal 104 may form part of the mesh network 108. For example, the mesh portal 104 may be a member access point of the mesh network 108 that has a dedicated uplink to a cloud system in the cloud environment 106. In order example embodiments, the mesh portal 104 may be a gateway or similar type of network device that sits outside of the mesh network 108 and provides a communication channel between the cloud environment 106 and the mesh points 102 of the mesh network 108.

As depicted in FIG. 1, within the mesh network 108, mesh communication links 112 (also referred to herein as mesh links) may be present between mesh points 102. Each mesh point 102 may attempt to form mesh links 112 with as many other mesh points 102 as possible, but may not form mesh links 112 with all other mesh points 102. Further, while a single communication link 110 is illustrated between the mesh portal 104 of the mesh network 108 for ease of depiction, it should be appreciated that each mesh point 102 may form an individual mesh link 110 with the mesh portal 104. In some embodiments, a mesh point 102 may establish a mesh link with another mesh point 102 by scanning channels in its provisioned band of operation to identify a list of neighboring mesh points 102 that match its mesh cluster profile. The mesh point 102 may then select the highest priority neighbors in terms of one or more network parameters (e.g., least expected path cost) with which to establish data links. The mesh communication links 110 (or simply mesh links 110) refer to these types of data links that are established between mesh points 102 based on their corresponding mesh cluster profiles.

Figure 2:
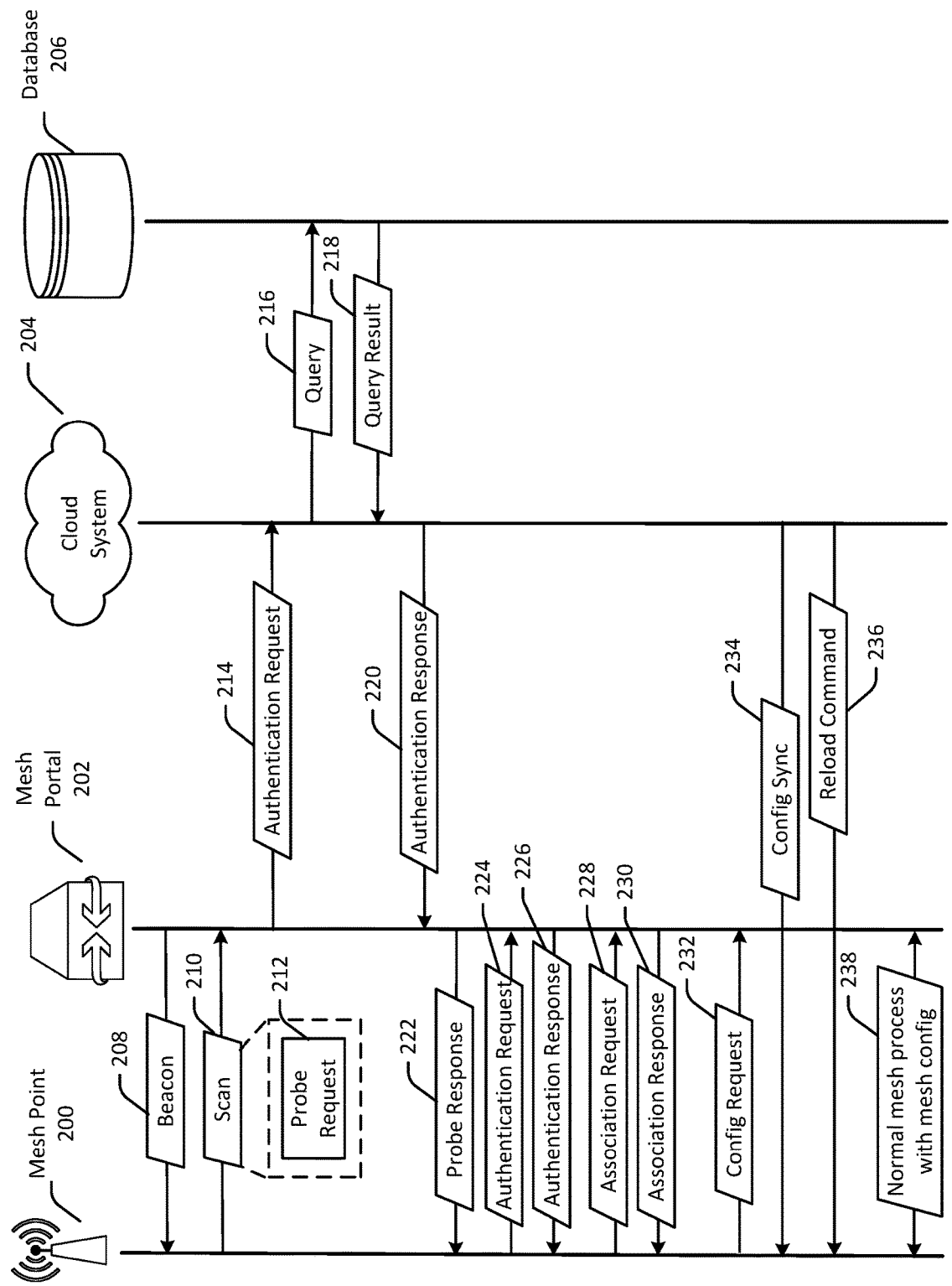
FIG. 2 depicts a series of data exchanges between an access point, a mesh portal, and/or a cloud system that occur in connection with authenticating a mesh point via a cloud-based authentication process, and upon authentication of the mesh point and establishment of a mesh link between the mesh point and the mesh portal, porting a mesh configuration to the mesh point according to example embodiments of the disclosed technology.

FIG. 2 depicts a series of data exchanges between a mesh point 200, a mesh portal 202, and/or a cloud system 204 that occur in connection with authenticating a mesh point via a cloud-based authentication process, and upon authentication of the mesh point and establishment of a mesh link between the mesh point and the mesh portal, porting a mesh configuration to the mesh point. The mesh point 200 may be an example implementation of the mesh point 100, the mesh portal 202 may be a specific implementation of the mesh portal 102, and the cloud system 204 may reside within the cloud environment 104.

Referring now to FIG. 2, the mesh portal 202 may receive a probe request 212 from the mesh point 200. In some embodiments, the probe request 212 includes specific information, based on which, the mesh portal 202 can determine that the mesh point 200 has entered a cloud-based porting mode. In some embodiments, prior to receiving the probe request 212, the mesh portal 202 broadcasts a beacon 208 signal that includes identifying information of the mesh portal 202 such as a service set identifier (SSID), a basic service set identifier (BSSID), or the like. Concurrently with the mesh portal 202 sending the beacon 208, the mesh point 200 may send out a scanning signal 210.

When the mesh point 200 first attempts to establish a mesh link (e.g., the mesh link 108) with the mesh portal 202, the scanning signal 210 may include, for example, the broadcast destination address (DA) FF:FF:FF:FF:FF, and optionally, may further include a BSSID and/or SSID associated with the mesh portal 202. In some embodiments, if a predetermined period of time (which may be configurable) elapses and the mesh point 200 has not been able to establish a mesh link with the mesh portal 202, the mesh point 200 may enter the cloud-based porting mode. After entering the cloud-based porting mode, the mesh point 200 may send out the probe request 212. The mesh point 200 may include specific values for the DA, BSSID, and SSID fields in the probe request 212 to indicate to the mesh portal 202 that the mesh point 200 has entered the cloud-based porting mode Based on these specific values being present in the probe request 212, the mesh portal 202 may determine that the mesh point 200 has entered the cloud-based porting mode, and thus, that it needs to contact the cloud system 204 as part of a cloud-based authentication and configuration deployment for the mesh point 200.

For instance, in some embodiments, the probe request 212 includes the same broadcast address FF:FF:FF:FF:FF in both the DA and the BSSID fields. Moreover, in some embodiments, the probe request 212 includes a device identifier of the mesh point 200 such as a media access control (MAC) address associated with the mesh point 200. The MAC address may be provided in the SSID field of the probe request 212. After receiving the probe request 212, the mesh portal 202 may parse the various fields in the probe request 212 to identify the values in the DA, BSSID, and/or SSID fields. In some embodiments, presence of the broadcast address FF:FF:FF:FF:FF in the DA and BSSID fields may be sufficient for the mesh portal 202 to determine that the mesh point 200 is in the cloud-based porting mode. In other example embodiments, in order to determine whether the mesh point 200 is in the cloud-based porting mode, the mesh portal 202 may also look to the SSID field. For instance, in some embodiments, in addition to the DA and BSSID fields including the required value, the SSID field in the probe request 212 may need to include a value having the format of a particular type of device identifier such as a MAC address in order for the mesh portal 202 to determine that the mesh point 200 is in the cloud-based porting mode.

Upon determining that the mesh point 200 is in the cloud-based porting mode based on various information contained in the probe request 212, the mesh portal 202 may initiate a cloud-based authentication process by generating an authentication request 214. The authentication request 214 may include the device identifier of the mesh point 200 (e.g., the MAC address) retrieved from the probe request 212. The mesh portal 202 may then send the authentication request 214 to the cloud system 204. In some embodiments, the mesh portal 202 may send the authentication request 214 via an existing web socket connection established between the mesh portal 202 and the cloud system 204. The mesh portal 202 may receive an authentication response 220 from the cloud system 204. The mesh portal 202 may determine, based on the authentication response 220, whether the mesh point 200 has been authenticated, and thus, accepted into the mesh deployment, or whether the mesh point 200 has not been authenticated, and thus, rejected from forming part of the mesh deployment.

Upon receiving the authentication request 214 from the mesh portal 202 on behalf of the mesh point 200, the cloud system 204 may determine a unique device identifier of the mesh point 200 from information contained in the authentication request 214. For instance, in some embodiments, the cloud system 204 may parse the authentication request 214 to retrieve a MAC address of the mesh point 200 from the request 214, which the mesh portal 202 may have received in the probe request 212 from the mesh point 200 and included in the authentication request 214.

The cloud system 204 may also determine one or more identifiers associated with the mesh portal 202. In some embodiments, the mesh portal identifiers may include a site identifier that identifies a physical site at which the mesh portal 202 is deployed and/or a customer identifier that identifies a customer with which the mesh portal 202 is associated. In some embodiments, the cloud system 204 may determine the site identifier and/or customer identifier associated with the mesh portal 202 by querying a database 206, which may include any suitable type of data store. For example, the database 206 may store an association between an identifier of the mesh portal 202 (e.g., a MAC address, Internet Protocol (IP) address, or the like) and the corresponding site and customer identifiers. The cloud system 204 may have already been aware of the mesh portal 202 identifier based on a communication link having already been established between the mesh portal 202 and the cloud system 204.

In some embodiments, the cloud system 204 may generate a query 216 to determine whether the mesh point 200 is linked to the one or more mesh portal identifiers. The query 216 may include, for example, the site identifier and customer identifier determined to be associated with the mesh portal 202 as well as the device identifier of the mesh point 200, e.g., a MAC address of the mesh point 200 or some other type of device identifier retrieved from the authentication request 214. The cloud system 204 may submit the query 216 to the database 206 to determine whether the database 206 contains a matching record that links the device identifier of the mesh point 200 with the site and customer identifiers associated with the mesh portal 202. The database 206 may return a query result 218 to the cloud system 204 that indicates whether such a matching record was located.

If a matching record is found, this may indicate that the mesh point 200 is located at the same physical site as the mesh portal 202 and is associated with the same customer, and thus, satisfies criteria for being authenticated with respect to the mesh portal 202 and accepted into the mesh deployment. In some embodiments, if the mesh point 200 is successfully authenticated at the cloud system 204 (e.g., a matching record for the mesh point 200 is located in the database 206), the cloud system 204 may return a device serial number or the like with the matching query result 218. If the query result 218 indicates that the device identifier of the mesh point 200 is linked to the mesh portal identifiers, the cloud system 204 may generate and send an authentication response 220 to the mesh portal 202 that indicates that the mesh point 200 has been successfully authenticated. Upon receipt of the authentication response 220, the mesh portal 202 may save the device serial number included therein. In some embodiments, the mesh portal 202 may use the device serial number as a passphrase for WiFi Protected Access (WPA), WPA2, and/or WPA3-based security encryption and authentication such as the WiFi Protected Access II—pre-shared key (WPA2-PSK) encryption protocol, which is designed for smaller networks and doesn't require an authentication server.

In some embodiments, after receiving the authentication response 220 from the cloud system 204 and determining that the response 220 indicates that the mesh point 200 was successfully authenticated, the mesh portal 202 may notify the mesh point 200 that it has been successfully authenticated with the cloud system 204, and the mesh point 200 and the mesh portal 202 may proceed with a series of data exchanges to authenticate the mesh point 200 with the mesh portal 202 using WPA-based authentication, for example, and to establish a mesh link between the mesh point 200 and the mesh portal 202 such that the mesh configuration can be pushed to the mesh point 200. In some embodiments, the cloud system 204 may push the mesh configuration to the mesh point 200 after being notified by the mesh portal 202, for example, that the mesh point 200 has successfully authenticated and associated with the mesh portal 202 (e.g., has established a mesh link with the mesh portal 202). The mesh configuration may have previously been stored at the cloud system 204. In other example embodiments, another network device such as a virtual controller designated by the mesh portal 202 may push the mesh configuration to the mesh point 200. In any case, after the mesh configuration is pushed to the mesh point 200, the cloud system 204 may send a reload command to the mesh point 200 to cause the mesh point 200 to reload and the newly pushed mesh configuration to take effect. In contrast, if the mesh point 200 is not successfully authenticated at the cloud system 204, the authentication response 220 may indicate that the mesh point 200 has been rejected from the mesh deployment. The mesh portal 202 may convey this rejection to the mesh point 200 and the process may halt.

The mesh portal 202 may send a probe response 222 to the mesh point 200 that is responsive to the probe request 212 initially received from the mesh point 200. Assuming that the authentication response 220 received from the cloud system 204 indicated that the mesh point 200 was successfully authenticated with the cloud system 204, the probe response 222 may similarly include an indication that the mesh point 200 was authenticated and approved for inclusion in the mesh deployment. In some embodiments, if the mesh point 200 was not successfully authenticated with the cloud system 204, the mesh portal 202 may simply not send a probe response to the mesh point 200. In such a scenario, the mesh point 200 may simply re-send the probe request 212 after some threshold period of time has elapsed.

Upon receipt of the probe response 222 indicating the mesh point 200 was successfully authenticated in the cloud, the mesh point 200 may send an authentication request 224 to the mesh portal 202. The mesh point 200 may send the authentication request 224 as part of a local area network authentication of the mesh point 200 with the mesh portal 202 based, for instance, on a WPA-based security encryption and authentication protocol. The authentication request 224 may include a device serial number of the mesh point 200 as a passphrase for the WPA-based authentication. Upon receipt of the authentication request 224, the mesh portal 202 may proceed to compare the passphrase included in the request 224 (e.g., the device serial number for the mesh point 200) to the saved device serial number it previously received from the cloud system 204. If the mesh portal 202 detects a match, it may generate and send an authentication response 226 and send the authentication response 226 to the mesh point 200. The authentication response 226 may indicate that the mesh point 200 was successfully authenticated based on the device serial number having been provided as the passphrase. The mesh point 200 may then proceed to associate with the mesh portal 202 and ultimately establish a mesh link with the mesh portal 202 and obtain the mesh configuration. If, on the other hand, the mesh portal 202 does not detect a match, the authentication response 226 may indicate that the mesh point 200 was not successfully authenticated, in which case the mesh point 200 may send another authentication request to the mesh portal 202 after some period of time has elapsed, for example.

Assuming that the mesh point 200 is successfully authenticated with the mesh portal 202 using, for example, WPA-based authentication, the mesh point 200 may then send an association request 228 to the mesh portal 202 to establish a mesh link with the mesh portal 202. Then, the mesh portal 202 may return an association response 230 to the mesh point 200 that indicates acceptance of the mesh point's 200 request for association. Upon receiving the association response 230, the mesh point 200 may proceed to establish a mesh communication link with the mesh portal 202 and join the mesh deployment (e.g., the mesh network 108). In particular, in some embodiments, the mesh point 200 is an access point that joins the access point swarm associated with the mesh portal 202 responsive to receiving the association response 230 indicating approval of the association request 228.

In some embodiments, establishing the mesh link with the mesh portal 202 may include obtaining Dynamic Host Configuration Protocol (DHCP) information, IP address information, or the like. In particular, the mesh point 200 may send a configuration request 232 to the mesh portal 202. The configuration request 232 may include a request for configuration information including a mesh configuration for the mesh point 200. The mesh portal 202 may then respond with configuration sync information 234 including the mesh configuration. The mesh configuration may include, for example, a name of the mesh network, a password for accessing the mesh network, and other configuration details that enable the mesh point 200 to successfully communicate with other nodes in the mesh network. In some embodiments, the mesh point 200 may not send the configuration request 232, but rather the cloud system 204 or a network device designated by the mesh portal 202 may push the mesh configuration to the mesh point 200 upon determining that the mesh point has successfully associated with the mesh portal 202.

Finally, the mesh portal 202 may determine that the mesh point 200 has successfully established a mesh link based on the received mesh configuration in accordance with a normal mesh communication process 238. As previously noted, the cloud system 204 may send a reload command 236 to the mesh point 200 to cause the mesh configuration to take effect upon reload of the mesh point 200. Further, in some embodiments, the cloud system 204 may also send a reload command 236 to the mesh point 200 if the wrong mesh configuration was pushed to the mesh point 200 or if the mesh configuration is improperly modified or entirely erased. The cloud system 204 may detect the wrong or improper mesh configuration by virtue of managing the mesh deployment remotely from the cloud or the mesh portal 202 may notify the cloud system 204 of a wrong/improper mesh configuration. After reloading based on the reload command 236, the mesh point 200 may then attempt to re-establish a mesh link with the mesh portal 202, and if it fails to do so after some first predetermined period of time elapses (e.g., 15 minutes), may enter the cloud-based porting mode and repeat the cloud-based authentication process described herein. Further, in some embodiments, after entering the cloud-based porting mode, if the mesh point 200 is unable to establish a mesh link with the mesh portal 202 after a second predetermined period of time elapses (e.g., 10 minutes), the mesh point 200 may reload and attempt the process again. The first and second predetermined periods of time may be configurable, and may be the same or different. Further, in some embodiments, the periods of time may be dynamically altered based on historical data indicative of the rate of success of establishing mesh links in the cloud-based porting mode, either for this particular mesh point 200 or across multiple mesh points 200.

Figure 3:
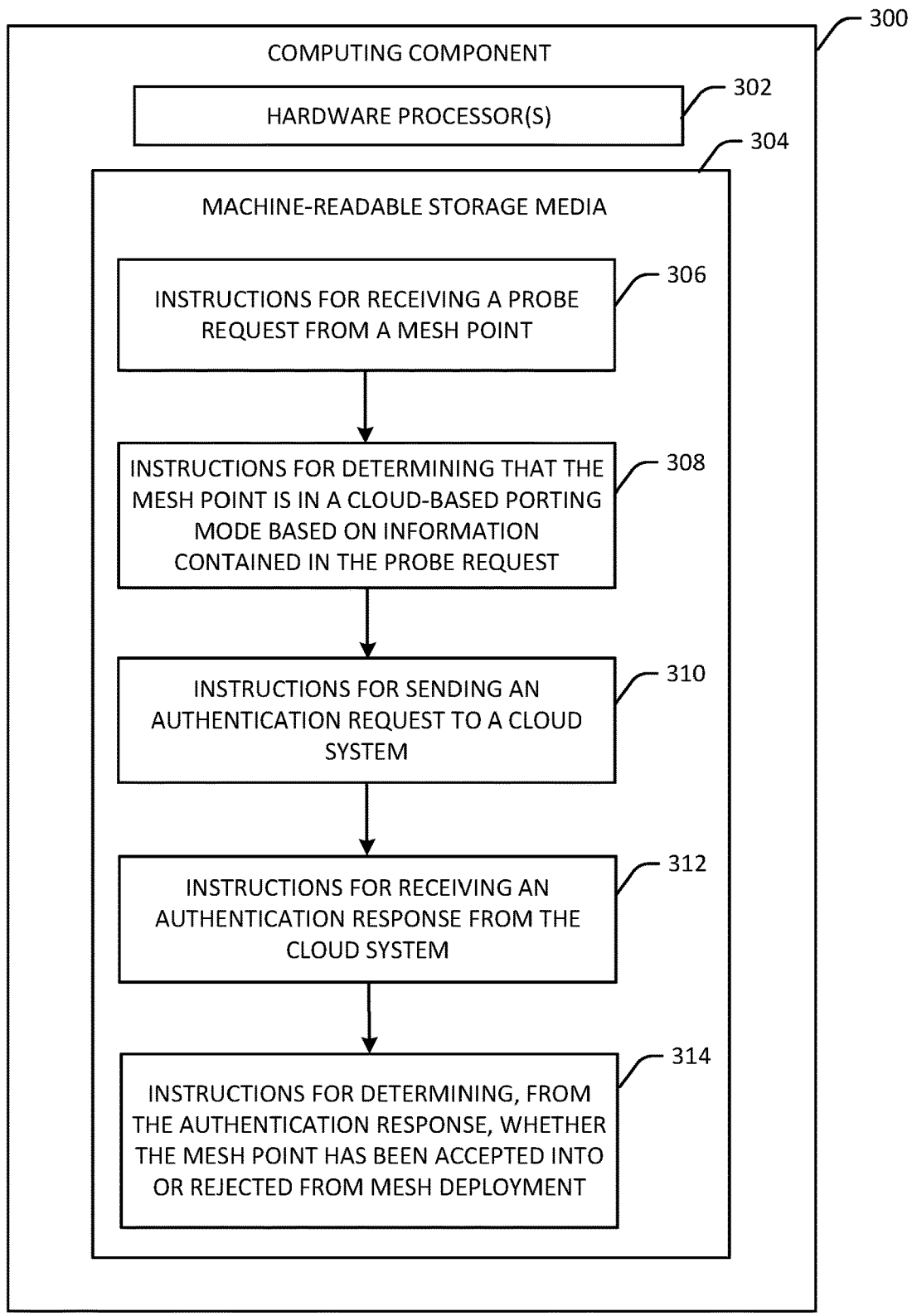
FIG. 3 depicts a set of executable instructions stored in machine-readable storage media that, when executed, cause an illustrative method to be performed for initiating and determining an outcome of a cloud-based authentication of a mesh point according to example embodiments of the disclosed technology.
Figure 4:
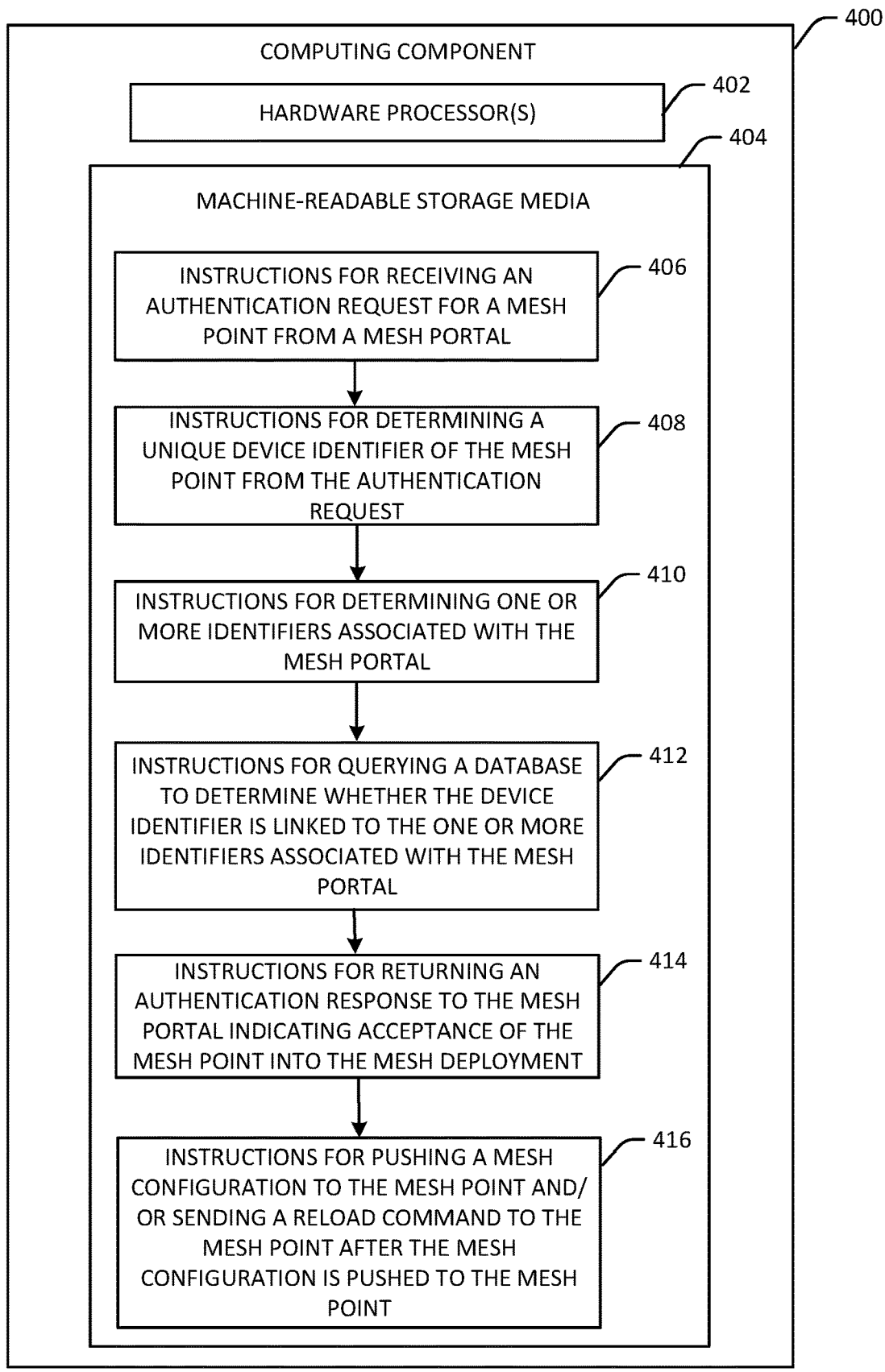
FIG. 4 depicts a set of executable instructions stored in machine-readable storage media that, when executed, cause an illustrative method to be performed for performing a cloud-based authentication of a mesh point according to example embodiments of the disclosed technology.
Figure 5:
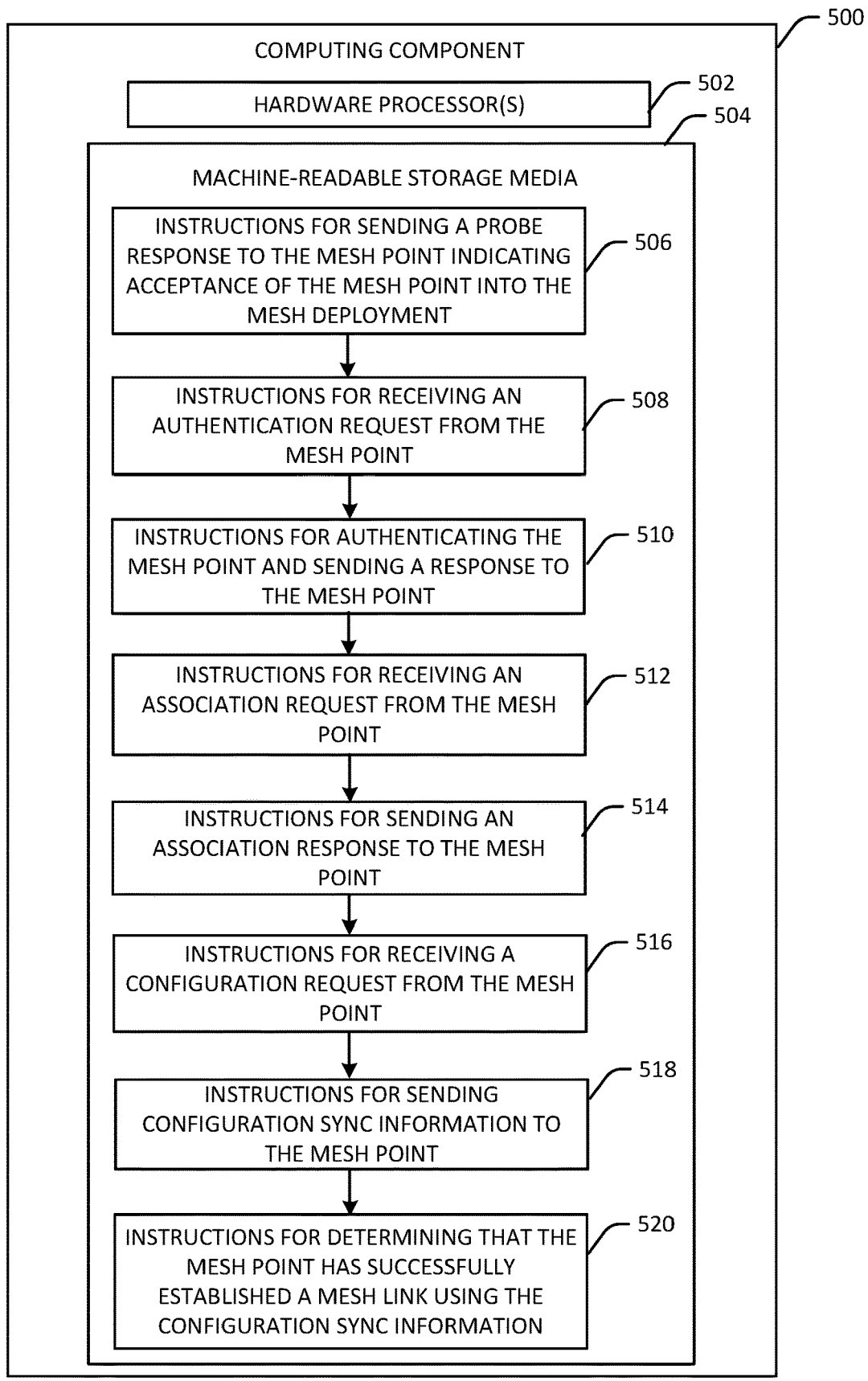
FIG. 5 depicts a set of executable instructions stored in machine-readable storage media that, when executed, cause an illustrative method to be performed for porting a mesh configuration to a mesh point after it has been authenticated via a cloud-based authentication process according to example embodiments of the disclosed technology.

FIG. 3 depicts a set of executable instructions stored in machine-readable storage media that, when executed, cause an illustrative method to be performed for initiating and determining an outcome of a cloud-based authentication of a mesh point. FIG. 4 depicts a set of executable instructions stored in machine-readable storage media that, when executed, cause an illustrative method to be performed for performing a cloud-based authentication of a mesh point. FIG. 5 depicts a set of executable instructions stored in machine-readable storage media that, when executed, cause an illustrative method to be performed for porting a mesh configuration to a mesh point after it has been authenticated via a cloud-based authentication process. In some embodiments, the sets of executable instructions depicted in FIGS. 3 and 5 may be executed by hardware processor(s) of the mesh portal 202 and the set of executable instructions depicted in FIG. 4 may be executed by hardware processor(s) of the cloud system 204.

FIG. 3 depicts a computing component 300 that includes one or more hardware processors 302 and machine-readable storage media 304 storing a set of machine-readable/machine-executable instructions. Similarly, FIG. 4 depicts a computing component 400 that includes one or more hardware processors 402 and machine-readable storage media 404 storing a set of machine-readable/machine-executable instructions, and FIG. 5 depicts a computing component 500 that includes one or more hardware processors 502 and machine-readable storage media 504 storing a set of machine-readable/machine-executable instructions.

Figure 6:
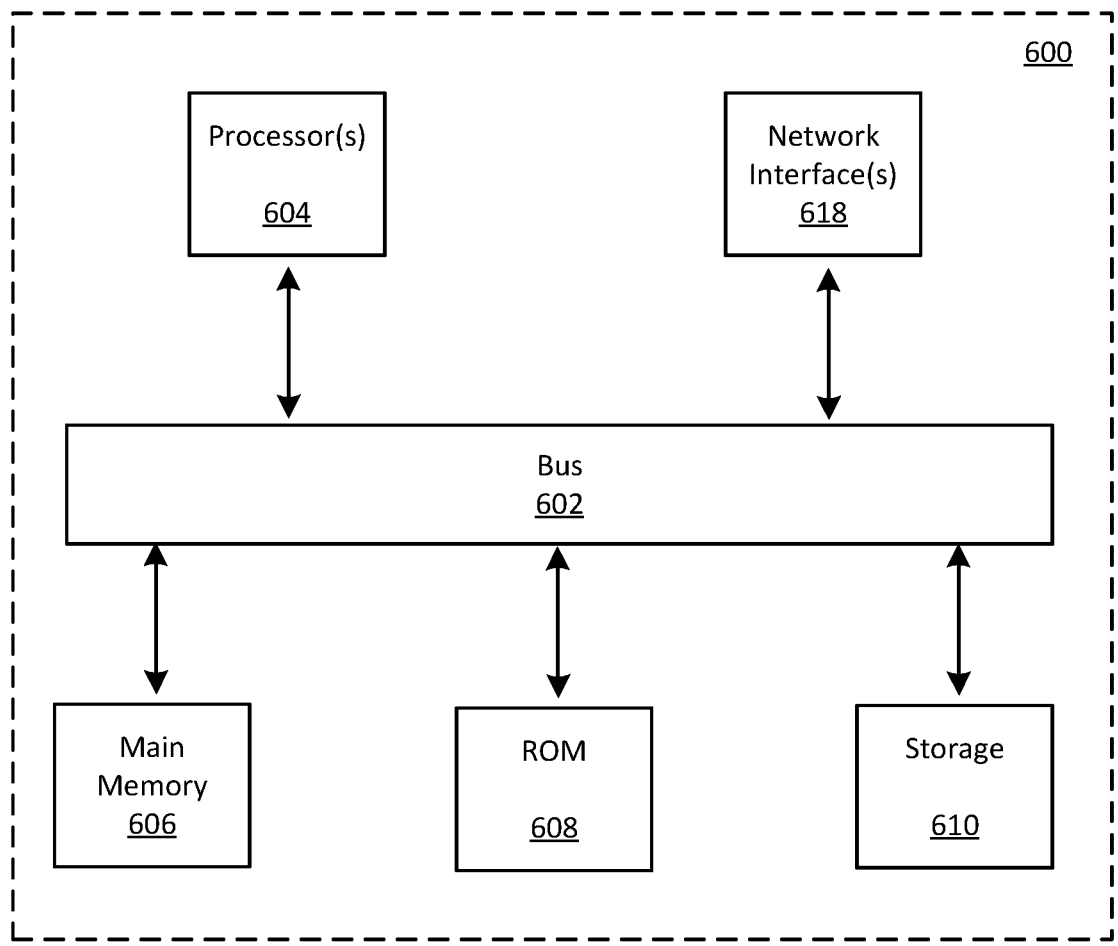
FIG. 6 is an example computing component that may be used to implement various features of example embodiments of the disclosed technology.

One or more of the computing components 300, 400, 500 may be, for example, the computing system 600 depicted in FIG. 6. In some embodiments, one or more of the computing components 300, 400, 500 is a network device such as an access point, a router or the like. In other example embodiments, one or more of the computing components 300, 400, 500 is a server, a server cluster, or the like. The hardware processors 302, 402, and/or 502 may include, for example, the processor(s) 604 depicted in FIG. 6 or any other processing unit described herein. The machine-readable storage media 304, 404, and/or 504 may include the main memory 606, the read-only memory (ROM) 608, the storage 610, or any other suitable machine-readable storage media described herein.

In some embodiments, the instructions depicted in any of FIGS. 3-5 as being stored on machine-readable storage media may be modularized into one or more computing engines/program modules. In particular, each such computing engine may include a set of machine-readable and machine-executable instructions, that when executed by a hardware processor, causes the hardware processor to perform corresponding tasks/processing. In some embodiments, the set of tasks performed responsive to execution of the set of instructions forming a particular computing engine may be a set of specialized/customized tasks for effectuating a particular type/scope of processing. The aforementioned engines/program modules can be implemented in any combination of hardware, software, and/or firmware. In some embodiments, these engines may be customized computer-executable logic implemented within a customized computing machine such as a customized field programmable gate array (FPGA) or an application specific integrated circuit (ASIC).

A system or device described herein as being configured to implement example embodiments of the disclosed technology (e.g., the computing device 600) can include one or more processing circuits, each of which can include one or more processing units or cores. These processing circuit(s) (e.g., hardware processors 302, 402, 502; processor(s) 604) may be configured to execute computer-executable code/instructions of various engines to cause input data contained in or referenced by the computer-executable program code/instructions to be accessed and processed by the processing unit(s)/core(s) to yield output data. It should be appreciated that any description herein of an engine performing a function inherently encompasses the function being performed responsive to computer-executable/machine-executable instructions of the engine being executed by a processing circuit.

An illustrative method performed responsive to execution of the set of stored instructions depicted in FIG. 3 will now be described. For illustrative purposes, the method performed responsive to execution of the set of stored instructions depicted in FIG. 3 will be described as being performed by or at the mesh portal 202. The disclosure is not so limited, however, and one or more steps of the method may be performed by other devices such as the mesh point 200 and/or the cloud system 204. Further, while various operations may be described as being performed by the mesh portal 202, it should be appreciated that such operations may be performed responsive to execution of corresponding machine-executable instructions by the hardware processor(s) 302.

Referring now to FIG. 3, responsive to execution of instructions 306 by hardware processor(s) 302, the mesh portal 202 may receive a probe request (e.g., probe request 212) from the mesh point 200. Then, responsive to execution of instructions 308, the mesh portal 202 may determine that the mesh point 200 is in a cloud-based porting model based on information contained in the probe request. For instance, as described earlier, the mesh portal 202 may determine that the mesh point 200 is in the cloud-based porting mode based on values in the DA, BSSID, and/or SSID fields of the received probe request.

Upon determining that the mesh point 200 is in the cloud-based porting mode, the mesh portal 202 may send an authentication request (e.g., authentication request 214) to the cloud system 204 responsive to execution of instructions 310. The authentication request may include a device identifier of the mesh point 200 (e.g., a MAC address), which the mesh portal 202 may have retrieved from the probe request. In some embodiments, the mesh portal 202 may send the authentication request via an existing web socket connection established between the mesh portal 202 and the cloud system 204.

Responsive to execution of instructions 312, the mesh portal 202 may receive an authentication response (e.g., authentication response 220) from the cloud system 204. Then, responsive to execution of instructions 314, the mesh portal 202 may determine, from the authentication response, whether the mesh point 200 has been accepted into or rejected from the mesh deployment. Operations that the mesh portal 202 may perform to inform the mesh point 200 as to whether it has been authenticated or rejected, and if authenticated, operations that the mesh portal 202 may perform to facilitate authentication and association of the mesh point 200 with the mesh portal 202, establishment of a mesh link between the mesh point 200 and the mesh portal 202, and ultimately delivery of the mesh configuration to the mesh point 200 will be described in more detail later in this disclosure in reference to FIG. 5.

Operations that may be performed by the cloud system 204 as part of the cloud-based authentication process will now be described in reference to FIG. 4. While described as being performed by or at the cloud system 204, it should be appreciated that one or more operations of the illustrative method performed responsive to execution of the set of executable instructions depicted in FIG. 4 may be performed by other devices such as the mesh point 200 and/or the mesh portal 202. Further, while various operations may be described as being performed by the cloud system 204, it should be appreciated that such operations may be performed responsive to execution of corresponding machine-executable instructions by the hardware processor(s) 402.

Referring now to FIG. 4, responsive to execution of instructions 406 by the hardware processor(s) 402, the cloud system 204 may receive the authentication request (e.g., authentication request 214) from the mesh portal 202. Responsive to execution of instructions 408, the cloud system 204 may determine a unique device identifier of the mesh point 200 from the authentication request. As previously described, the unique device identifier may be a MAC address or the like of the mesh point 200. The mesh portal 202 may retrieve the MAC address of the mesh point 200 from the probe request that it receives from the mesh point 200, and may then include the retrieved identifier in the authentication request that it sends to the cloud system 204.

Responsive to execution of instructions 410, the cloud system 204 may determine one or more identifiers associated with the mesh portal 202. In some embodiments, the mesh portal identifiers may include a site identifier that identifies a physical site at which the mesh portal 202 is deployed and/or a customer identifier that identifies a customer with which the mesh portal 202 is associated. In some embodiments, the cloud system 204 may determine the site identifier and/or customer identifier associated with the mesh portal 202 by querying a data store (e.g., the database 206), which may store an association between an identifier of the mesh portal 202 (e.g., a MAC address, Internet Protocol (IP) address, or the like) and the corresponding site and customer identifiers.

Responsive to execution of instructions 412, the cloud system 204 may generate and submit a query 216 to the database 206 to determine whether the database 206 contains a matching record that links the device identifier of the mesh point 200 with the site and customer identifiers associated with the mesh portal 202. The query 216 may include, for example, the site identifier and customer identifier determined to be associated with the mesh portal 202 as well as the device identifier of the mesh point 200, e.g., a MAC address of the mesh point 200 or some other type of device identifier retrieved from the authentication request received from the mesh portal 202. The database 206 may return a query result (e.g., query result 218) to the cloud system 204 that indicates whether such a matching record was located.

If a matching record is found, this may indicate that the mesh point 200 is located at the same physical site as the mesh portal 202 and is associated with the same customer, and thus, satisfies criteria for being authenticated with respect to the mesh portal 202 and accepted into the mesh deployment. If the returned query result indicates that the device identifier of the mesh point 200 is linked to the mesh portal identifiers, the cloud system 204 may generate and send, responsive to execution of instructions 414, an authentication response (e.g., authentication response 220) to the mesh portal 202 that indicates that the mesh point 200 has been successfully authenticated. Along with an indication that the mesh point 200 has been authenticated by the cloud system 204, the authentication response may include a device serial number for the mesh point 200 which can be used as a passphrase for a security encryption and authentication protocol executed between the mesh point 200 and the mesh portal 202.

After receiving the authentication response from the cloud system 204 and determining that the response indicates that the mesh point 200 was successfully authenticated, the mesh portal 202 may notify the mesh point 200 that it has been successfully authenticated with the cloud system 204, and the mesh point 200 and the mesh portal 202 may proceed with a series of data exchanges to authenticate the mesh point 200 with the mesh portal 202 using WPA-based authentication, for example, and to establish a mesh link between the mesh point 200 and the mesh portal 202 such that the mesh configuration can be pushed to the mesh point 200. Then, responsive to execution of instructions 416, the cloud system 204 may push the mesh configuration to the mesh point 200 after being notified by the mesh portal 202, for example, that the mesh point 200 has successfully authenticated and associated with the mesh portal 202 (e.g., has established a mesh link with the mesh portal 202). The mesh configuration may have previously been stored at the cloud system 204. In other example embodiments, another network device such as a virtual controller designated by the mesh portal 202 may push the mesh configuration to the mesh point 200. In any case, after the mesh configuration is pushed to the mesh point 200, the cloud system 204 may send a reload command to the mesh point 200 to cause the mesh point 200 to reload and the newly pushed mesh configuration to take effect.

Operations that may be performed by the mesh portal 202 as part of the post-cloud-based authentication process for establishing a mesh link between the mesh point 200 and the mesh portal 202 will now be described in reference to FIG. 5. While described as being performed by or at the mesh portal 202, it should be appreciated that one or more operations of the illustrative method performed responsive to execution of the set of executable instructions depicted in FIG. 5 may be performed by other devices such as the mesh point 200 and/or the cloud system 204. Further, while various operations may be described as being performed by the mesh portal 202, it should be appreciated that such operations may be performed responsive to execution of corresponding machine-executable instructions by the hardware processor(s) 502.

Referring now to FIG. 5, responsive to execution of instructions 506, the mesh portal 202 may send a probe response (e.g., probe response 222) to the mesh point 202 in response to the previously received probe request (e.g., probe request 212). Assuming that the authentication response received from the cloud system 204 indicated that the mesh point 200 was successfully authenticated with the cloud system 204, the probe response may similarly include an indication that the mesh point 200 was authenticated and approved for inclusion in the mesh deployment. Upon receipt of the probe response indicating the mesh point 200 was successfully authenticated in the cloud, the mesh point 200 may send an authentication request (e.g., authentication request) 224, which may be received by the mesh portal 202 responsive to execution of instructions 508. The mesh point 200 may send the authentication request as part of a local area network authentication of the mesh point 200 with the mesh portal 202 based, for instance, on a WPA-based security encryption and authentication protocol. The authentication request may include a device serial number of the mesh point 200 as a passphrase for the WPA-based authentication.

Upon receipt of the authentication request, the mesh portal 202 may proceed to authenticate the mesh point 200 responsive to execution of instructions 510. In particular, the mesh portal 202 may compare the passphrase included in the authentication request received from the mesh point 200 (e.g., the device serial number for the mesh point 200) to the saved device serial number it previously received from the cloud system 204. If the mesh portal 202 detects a match, it may generate and send, responsive to execution of instructions 510, an authentication response to the mesh point 200 (e.g., authentication response 226). The authentication response may indicate that the mesh point 200 was successfully authenticated based on the device serial number having been provided as the passphrase. The mesh point 200 may then proceed to associate with the mesh portal 202 and ultimately establish a mesh link with the mesh portal 202 and obtain the mesh configuration. If, on the other hand, the mesh portal 202 does not detect a match, the authentication response may indicate that the mesh point 200 was not successfully authenticated, in which case, the mesh point 200 may send another authentication request to the mesh portal 202 after some period of time has elapsed, for example.

Assuming that the mesh point 200 is successfully authenticated with the mesh portal 202 using, for example, WPA-based authentication, the mesh point 200 may then send an association request (e.g., association request 228) to establish a mesh link with the mesh portal 202. The association request may be received by the mesh portal 202 responsive to execution of instructions 512. Then, responsive to execution of instructions 514, the mesh portal 202 may return an association response (e.g., association response 230) to the mesh point 200 that indicates acceptance of the mesh point's 200 request for association. Upon receiving the association response, the mesh point 200 may proceed to establish a mesh communication link with the mesh portal 202 and join the mesh deployment (e.g., the mesh network 108).

In some embodiments, establishing the mesh link with the mesh portal 202 may include obtaining DHCP information, IP address information, or the like. In particular, the mesh point 200 may send a configuration request (e.g., configuration request 232), which may be received by the mesh portal 202 responsive to execution of instructions 516. The configuration request may include a request for configuration information including a mesh configuration for the mesh point 200. Then, responsive to execution of instructions 518, the mesh portal 202 may respond to the configuration request with configuration sync information (e.g., configuration sync information 234) that includes the mesh configuration. The mesh configuration may include, for example, a name of the mesh network, a password for accessing the mesh network, and other configuration details that enable the mesh point 200 to successfully communicate with other nodes in the mesh network. In some embodiments, the mesh point 200 may not send the configuration request 232, but rather the cloud system 204 or a network device designated by the mesh portal 202 may push the mesh configuration to the mesh point 200 upon determining that the mesh point has successfully associated with the mesh portal 202.

Finally, responsive to execution of instructions 520, the mesh portal 202 may determine that the mesh point 200 has successfully established a mesh link based on the received mesh configuration in accordance with a normal mesh communication process (e.g., process 238). As previously noted, the cloud system 204 may send a reload command (e.g., reload command 236) to the mesh point 200 to cause the mesh configuration to take effect upon reload of the mesh point 200.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A mesh configuration porting method for a cloud-based mesh deployment, the method comprising:
   authenticating a mesh point at a cloud system;
   sending a notification to the mesh point indicating that the mesh point has been authenticated;
   determining that the mesh point has established a mesh communication link with a mesh portal associated with the cloud-based mesh deployment;
   porting a mesh configuration to the mesh point; and
   managing the mesh point at the cloud system after the mesh point is configured based on the mesh configuration.

2. The method of claim 1, further comprising determining that the mesh point is in a cloud-based porting mode, wherein the mesh point is authenticated at the cloud system responsive to determining that the mesh point is in the cloud-based porting mode, and wherein determining that the mesh point is in the cloud-based porting mode comprises:
   receiving, at the mesh portal, a probe request from the mesh point; and
   determining that the mesh point is in the cloud-based porting mode based on information contained in the probe request.

3. The method of claim 2, wherein determining that the mesh point is in the cloud-based porting mode based on information contained in the probe request comprises:
   determining that at least one of a destination address field or a basic service set identifier field in the probe request includes a value that matches a predetermined value indicative of the cloud-based porting mode.

4. The method of claim 3, wherein determining that the mesh point is in a cloud-based porting mode based on information contained in the probe request further comprises:
   determining that a service set identifier field in the probe request includes a device identifier of the mesh point.

5. The method of claim 4, wherein the device identifier is a media access control (MAC) address of the mesh point.

6. The method of claim 2, further comprising:
   generating, at the mesh portal, an authentication request that includes a device identifier of the mesh point retrieved from the probe request; and
   sending the authentication request to the cloud system.

7. The method of claim 6, wherein authenticating the mesh point at the cloud system comprises:
   determining one or more identifiers associated with the mesh portal;
   retrieving the device identifier of the mesh point from the authentication request; and
   determining that the device identifier of the mesh point is linked to the one or more identifiers associated with the mesh portal.

8. The method of claim 7, wherein determining that the device identifier of the mesh point is linked to the one or more identifiers associated with the mesh portal comprises:
   generating a database query comprising the one or more identifiers associated with the mesh portal and the device identifier of the mesh point; and
   receiving a query result indicating that the device identifier of the mesh point is linked to the one or more identifiers associated with the mesh portal.

9. The method of claim 7, wherein the one or more identifiers associated with the mesh portal comprise at least one of a site identifier of a physical site at which the mesh portal is deployed or a customer identifier of a customer with which the mesh portal is associated.

10. The method of claim 9, wherein the device identifier of the mesh point is linked to the site identifier and the customer identifier, thereby indicating that the mesh point is located at the physical site at which the mesh portal is deployed and is also associated with the customer with which the mesh portal is associated.

11. The method of claim 1, wherein porting the mesh configuration to the mesh point comprises:
    sending, by the cloud system, the mesh configuration to the mesh point.

12. The method of claim 1, wherein porting the mesh configuration to the mesh point comprises:
    sending, by a virtual controller designated by the mesh portal, the mesh configuration to the mesh point.

13. The method of claim 1, further comprising:
    sending, by the cloud system, a reload command to the mesh point to cause the mesh point to reload,
    wherein after reloading the mesh point utilizes the mesh configuration to re-establish the mesh communication link with the mesh portal.

14. The method of claim 1, further comprising:
    determining that the mesh configuration sent to the mesh point was improper, was improperly modified, or was lost; and
    sending, by the cloud system, a reload command to the mesh point,
    wherein the mesh point is re-authenticated at the cloud system responsive to reloading based on the reload command.

15. A cloud-based system for managing a mesh deployment, comprising:
    a memory storing machine-executable instructions; and
    a processor configured to access the memory and execute the machine-executable instructions to:
       authenticate a mesh point operating in cloud-based porting mode;
       send a notification to the mesh point indicating that the mesh point has been authenticated; and port a mesh configuration to the mesh point responsive to the mesh point establishing a mesh communication link with a mesh portal of the mesh deployment.

16. The cloud-based system of claim 15, wherein the processor is further configured to execute the computer-executable instructions to determine that the mesh point is in a cloud-based porting mode based on information contained in a probe request received from the mesh point, and wherein the mesh point is authenticated responsive to the determination that the mesh point is in the cloud-based porting mode.

17. The cloud-based system of claim 16, wherein the processor is configured to determine that the mesh point is in the cloud-based porting mode based on information contained in the probe request by executing the computer-executable instructions to:
  determine that at least one of a destination address field or a basic service set identifier field in the probe request includes a value that matches a predetermined value indicative of the cloud-based porting mode; and
  determine that a service set identifier field in the probe request includes a device identifier of the mesh point.

18. The cloud-based system of claim 15, wherein the processor is configured to authenticate the mesh point by executing the computer-executable instructions to:
  determine one or more identifiers associated with the mesh portal;
  retrieve the device identifier of the mesh point from an authentication request received from the mesh portal; and
  determine that the device identifier of the mesh point is linked to the one or more identifiers associated with the mesh portal.

19. The cloud-based system of claim 18, wherein the one or more identifiers associated with the mesh portal comprise at least one of a site identifier of a physical site at which the mesh portal is deployed or a customer identifier of a customer with which the mesh portal is associated.

20. A computer program product for mesh configuration porting within a cloud-based mesh deployment, the computer program product comprising a non-transitory computer readable medium storing program instructions that, when executed by a processor, cause operations to be performed comprising:
  performing, at a cloud system, a cloud-based authentication of a mesh point; and
  porting a mesh configuration to the mesh point responsive to determining that the mesh point has established a mesh communication link with a mesh portal associated with the cloud-based mesh deployment,
  wherein the cloud system manages the mesh point after the mesh point is configured based on the mesh configuration, and
  wherein the mesh configuration is ported to the mesh point while the mesh point is located at a serving location of a deployment site of the cloud-based mesh deployment.

* * * * *